US012638092B2

(12) United States Patent
Chavez Sandoval et al.

(10) Patent No.: US 12,638,092 B2
(45) Date of Patent: May 26, 2026

(54) PRESSURE RELIEF VALVE WITH DUAL-FUNCTION SPRING

(71) Applicant: PHINIA Jersey Holdings LLC, Wilmington, DE (US)

(72) Inventors: Cesar Cain Chavez Sandoval, Ciudad Juarez (MX); Juan Lopez Marrufo, Ciudad Juarez (MX)

(73) Assignee: PHINIA Jersey Holdings LLC, Wilmington, DE (US)

( * ) Notice: Subject to any disclaimer, the term of this patent is extended or adjusted under 35 U.S.C. 154(b) by 82 days.

(21) Appl. No.: 18/907,741

(22) Filed: Oct. 7, 2024

(65) Prior Publication Data

US 2026/0098590 A1 Apr. 9, 2026

(51) Int. Cl.
*F16K 17/06* (2006.01)
*F16K 15/02* (2006.01)
*F16K 17/04* (2006.01)

(52) U.S. Cl.
CPC .......... *F16K 17/06* (2013.01); *F16K 17/0406* (2013.01); *F16K 15/026* (2013.01); *F16K 2200/304* (2021.08); *F16K 2200/3053* (2021.08); *Y10T 137/7927* (2015.04)

(58) Field of Classification Search
CPC ..... F16F 1/047; F16F 1/06; F16F 1/08; F16K 15/026; F16K 15/044; F16K 17/06; F16K 2200/304; F16K 2200/3053; Y10T 137/7924; Y10T 137/7927; Y10T 137/7929
USPC ........................................................ 251/337
See application file for complete search history.

(56) References Cited

U.S. PATENT DOCUMENTS

| | | | | |
|---|---|---|---|---|
| 2,896,661 | A | * | 7/1959 | Becker .................. F16K 15/144 |
| | | | | 137/845 |
| 2,896,663 | A | | 7/1959 | Mena |
| 4,195,656 | A | * | 4/1980 | Kanerva ............... F16K 15/065 |
| | | | | 137/540 |
| 5,104,091 | A | * | 4/1992 | Rathay .................. F16K 11/048 |
| | | | | 137/596.17 |
| 2009/0106908 | A1 | | 4/2009 | DeFranks et al. |
| 2017/0335914 | A1 | | 11/2017 | Thomas et al. |
| 2019/0113094 | A1 | * | 4/2019 | Watanabe ............... F16F 1/047 |
| 2019/0211789 | A1 | * | 7/2019 | Zankl .................... F16K 15/044 |
| 2023/0349477 | A1 | * | 11/2023 | Cao ..................... F16K 17/0466 |

* cited by examiner

*Primary Examiner* — Robert K Arundale
(74) *Attorney, Agent, or Firm* — WARNER NORCROSS + JUDD LLP

(57) ABSTRACT

A pressure relief valve includes a valve body having an inner wall defining a cylindrical bore. The inner wall includes a threaded region having a plurality of threads. The valve includes a pressure control calibration spring including a calibration portion and a force application portion. The calibration portion is threaded into the threads of the threaded region. The valve body includes an aperture in fluid communication with the cylindrical bore. An inner perimeter of the aperture defines a valve seat. A valve member is receivable on the valve seat. The force application portion urges the valve member into engagement with the valve seat and has a pitch that is greater than a pitch of the calibration portion. Rotation of the calibration portion in the threads of the threaded region of the valve body adjusts the spring force applied to the valve member by the force application portion.

20 Claims, 7 Drawing Sheets

PRESSURE RELIEF VALVE WITH DUAL-FUNCTION SPRING

FIELD OF THE INVENTION

The disclosure generally relates to pressure relief valves and, more specifically, to calibration of pressure relief valves.

BACKGROUND OF THE INVENTION

Conventional pressure relief valves generally may have a valve member that is urged into engagement with a valve seat by a spring member. When liquid pressure on a side of the valve member opposite the spring member is greater than the spring force of the spring member, the valve member is unseated and the liquid may flow past the valve member. In some conventional pressure relief valves, the spring force of the spring member is calibrated by a "set screw" in the form of a threaded nut or similar that is engaged with an end of the spring member opposite the valve member. Screwing of the set screw increases or decreases the compression of the spring member, thereby adjusting the spring force and in turn calibrating the amount of pressure required to open the valve member. In other conventional pressure relief valves, the valve body may be formed of two components, with one of the components being press-fit into the other component. The press-fit component is engaged with an end of the spring member opposite the valve member, and the distance that the press-fit component is press-fit into the other component determines the amount of compression of the spring member. However, a need continues to exist for a pressure relief valve that is simpler in construction and/or requires fewer components to achieve the calibration of the valve.

BRIEF SUMMARY

An improved pressure relief valve including a dual-pitch, dual-function valve spring is provided. In some embodiments, the pressure relief valve includes a valve body having a plurality of inner threads, and a valve spring that is a coil spring including a first portion and a second portion. The first portion has a first pitch and the second portion has a second pitch. The second pitch is greater than the first pitch. The first portion of the valve spring is threaded into the inner threads of the valve body, and the first pitch of the first portion of the valve spring is equal to a pitch of the inner threads of the valve body. Rotation of the first portion of the valve spring in the inner threads of the valve body adjusts an axial position of the valve spring within the valve body, thereby adjusting an actuation pressure of the pressure relief valve.

In specific embodiments, the valve spring has a plurality of coil turns, the first portion being is by a portion of the plurality of coil turns, and the second portion is defined by another portion of the plurality of coil turns.

In particular embodiments, a diameter of the coil turns defining the first portion is larger than a diameter of the coil turns defining the second portion.

In specific embodiments, the valve body includes at least one stop that limits outward rotation of the first portion of the valve spring.

In specific embodiments, the valve spring includes an arm extending from a terminal end of the first portion, and the arm defines a handle for rotating the valve spring.

In specific embodiments, the pressure relief valve further includes a valve member. The valve member is urged in an axial direction by the second portion of the valve spring, and rotation of the first portion of the valve spring adjusts an amount of force applied to the valve member by the second portion of the valve spring.

In other embodiments, the pressure relief valve includes a valve body having an inner wall defining a cylindrical bore. The inner wall includes a threaded region having a plurality of threads. The pressure relief valve further includes a pressure control calibration spring including a calibration portion and a force application portion. The calibration portion is threaded into the threads of the threaded region of the inner wall. The valve body includes an aperture in fluid communication with the cylindrical bore. An inner perimeter of the aperture defines a valve seat. A valve member is receivable on the valve seat. The force application portion urges the valve member into engagement with the valve seat. The force application portion has a pitch that is greater than a pitch of the calibration portion. Rotation of the calibration portion in the threads of the threaded region of the valve body adjusts the spring force applied to the valve member by the force application portion of the pressure control calibration spring.

In specific embodiments, the pressure control calibration spring is a coil spring having a plurality of coil turns, the calibration portion being defined by part of the plurality of coil turns and the force application portion being defined by another part of the plurality of coil turns.

In particular embodiments, the coil turns of the calibration portion are in series with the coil turns of the force application portion.

In specific embodiments, a diameter of the coil turns defining the calibration portion is larger than a diameter of the coil turns defining the force application portion.

In specific embodiments, the pressure control calibration spring includes an arm extending from a terminal end of the calibration portion.

In particular embodiments, the arm is generally straight and extends inwards towards a center of the pressure control calibration spring.

In specific embodiments, the valve member is a ball.

In specific embodiments, the pressure relief valve further includes an annular ring having an inner shoulder that engages the valve member, and the annular ring further includes an outer plate engaged by the force application portion of the pressure control calibration spring.

In specific embodiments, the pressure relief valve further includes at least one stop that limits outward rotation of the calibration portion of the pressure control calibration spring.

In particular embodiments, each stop is an inward projection along the inner wall of the valve body.

A method of adjusting a pressure relief valve is also provided. The method includes providing a pressure relief valve according to any of the embodiments described above. The method further includes applying a turning force to the pressure control calibration spring to rotate the calibration portion in the threads of the threaded region of the valve body. The rotation of the calibration portion adjusts the spring force applied to the valve member by the force application portion of the pressure control calibration spring.

In specific embodiments, the rotation of the calibration portion moves the pressure control calibration spring closer to the valve member in an axial direction of the valve body to increase the spring force applied to the valve member, whereby an actuation pressure of the pressure relief valve is increased.

A method of making a pressure relief valve is also provided. The pressure relief valve is one according to any of the embodiments described above. The method includes providing the valve body having the inner wall defining the cylindrical bore. The method further includes disposing the valve member on the valve seat in the valve body. The method further includes forming threads in the inner wall to form the threaded region having the plurality of threads. The method further includes forming the pressure control calibration spring including the calibration portion and the force application portion, such that the force application portion has a pitch that is greater than a pitch of the calibration portion. The method further includes threading the calibration portion into the threads of the threaded region of the valve body. The force application portion urges the valve member towards the valve seat, and rotation of the calibration portion in the threads of the threaded region of the valve body adjusts the spring force applied to the valve member by the force application portion.

In specific embodiments, the pressure control calibration spring is a coil spring having a plurality of coil turns, and the calibration portion is defined by part of the plurality of coil turns and the force application portion is defined by another part of the plurality of coil turns.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

Figure 1:
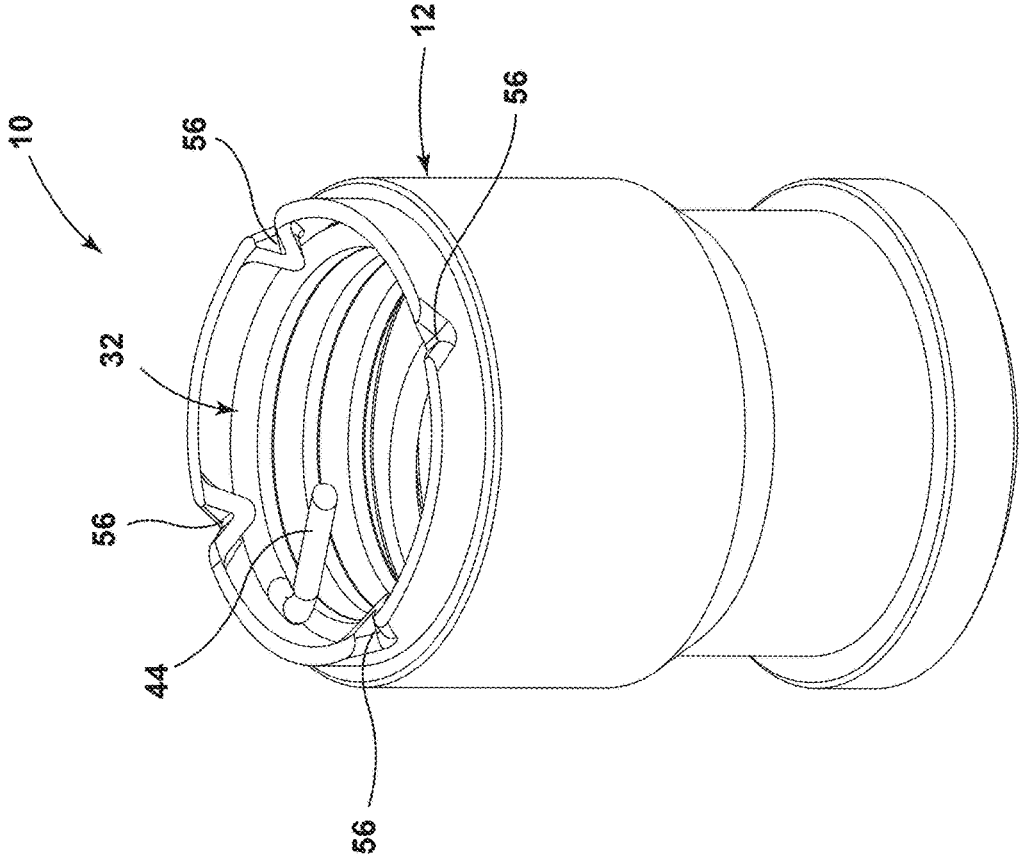
FIG. 1 is a perspective view of a pressure relief valve in accordance with embodiments of the disclosure.

A pressure relief valve is provided. Referring to FIGS. 1-8, wherein like numerals indicate corresponding parts throughout the several views, the pressure relief valve (also referred to as the valve herein) is illustrated and generally designated as 10, 110. As described in detail below, the pressure relief valve 10, 110 includes a dual-pitch, dual-function resilient spring member that integrally has structural components that together provide for both the closing force of the valve and the calibration of the closing force. The pressure relief valve 10, 110 therefore may have fewer parts and a simpler construction than conventional relief valves. The pressure relief valve 10, 110 also may be easier to construct.

With reference first to FIGS. 1-6, the pressure relief valve 10 includes a valve body 12. The valve body 12 has an inner wall 14 that defines a cylindrical bore 16. The cylindrical bore 16 has a first end 18 and a second end 20. The valve body 12 includes an aperture 22 at the first end 18 of the cylindrical bore 16. The aperture 18 is in fluid communication with the cylindrical bore 16 and provides for communication of fluid between the outside of the valve body 12 and the cylindrical bore 16 within the valve body 12. The aperture 22 may be generally centrally located relative to a center of the cylindrical bore 16. An inner perimeter 24 of the aperture 22 defines a valve seat 26. The inner wall 14 of the valve body 12 includes a threaded region 28 adjacent the second end 20 of the cylindrical bore 16. The threaded region 28 has a plurality of inner threads 30. The threads 30 have a predetermined thread pitch 31, the thread pitch being the distance (in this case, in an axial direction A of the cylindrical bore 16) between one thread and the next thread at the same point (in this case, the same point in a radial/circumferential R direction of the cylindrical bore 16).

The valve 10 further includes a valve spring member in the form of a pressure control calibration spring 32 (hereinafter "spring"). The spring 32 integrally includes both a first, calibration portion 34 and a second, force application portion 36. The calibration portion 34 functions to calibrate the spring 32, and the force application portion 36 functions to provide a closing force that maintains the valve 10 in a closed state until an external force acting on the valve is greater than the closing force. Preferably, the spring 32 is a coil spring having a plurality of coil turns, and the calibration portion 34 is defined by some (a part) of the coil turns 38 while the force application portion 36 is defined by other (another part) of the coil turns 39. However, while the spring 32 is described and shown as a coil spring, it should be understood that the spring could be a different type of spring such as a compression spring other than a coil spring. The coil turns 38 defining the calibration portion 34 and the coil turns 39 the force application portion 36 may constitute the entirety or a substantial portion of the spring 32, however the spring 32 may have additional portions as describe below. The coil turns 38 of the calibration portion 34 are in series with the coil turns 39 of the force application portion 36. The coil turns 38 may be in direct series with the coil turns 39; however, there may be a transition portion between the coil turns 38 and the coil turns 39. The coil turns 38 of the calibration portion 34 have a first pitch 40, the pitch being the distance (in this case, in an axial direction of the spring 32) between one coil turn and the next coil turn at the same point (in this case, the same point in a radial/circumferential direction of the spring 32). The coil turns 39 of the force application portion 36 have a second pitch 42, the pitch being the distance (in this case, in an axial direction of the spring 32) between one coil turn and the next coil turn at the same point (in this case, the same point in a radial/circumferential direction of the spring 32). The second pitch 42 of the force application portion 36 is greater than the first pitch 40 of the calibration portion 34. Stated differently, the first pitch 40 is less than the second pitch 42. As such, the force application portion 36 may be compressed to a greater degree than the calibration portion 34, although when the spring 32 is mounted in the valve body 12, only the force application portion 36 is compressible. Thus, only the force application portion 36 is intended to be compressed. The coil turns 38 of the calibration portion 34 also have an outer diameter d1, which is a distance across and through the center of a coil turn 38 in a radial direction of the spring 32. The coil turns 39 of the force application portion 36 likewise have an outer diameter d2, which is a distance across and through the center of a coil turn 39 in a radial direction of the spring 32. The outer diameter d1 of the coil turns 38 is greater than the outer diameter d2 of the coil turns 39.

The calibration portion 34 of the spring 32 is threaded into the threads 30 of the threaded region 28 of the cylindrical bore 16 in the valve body 12 by applying a turning force to the spring 32 to rotate the calibration portion 34 in the threads 30. Particularly, the pitch 40 of the coil turns 38 of the calibration portion 34 is equal to or approximately equal to the pitch 31 of the threads 30 of the threaded region 28 within the cylindrical bore 16. Further, the diameter d1 of the coil turns 38 of the calibration portion 34 is equal to or approximately equal to the diameter d3 of the threaded region 28. As such, the calibration portion 34 can be screwed into the threads 30 by turning the spring 32 about the threads 30 to adjustably mount the spring 32 within the cylindrical bore 16. The spring 32 may include an arm 44 that extends from a terminal end 46 of the calibration portion 34 towards the space within the boundary of the calibration portion. For example, the arm 44 may extend towards the center of the spring 32; however, the arm 44 alternatively may extend towards an inward point that is offset from the center. The arm 44 defines a handle for gripping and rotating the calibration portion 34 of the spring 32 in the threads 30 of the threaded region 28. The arm 44 thereby facilitates the rotation and adjustment of the radial and axial positions of the spring 32 relative to the threads 30 and cylindrical bore 16.

Figure 2:
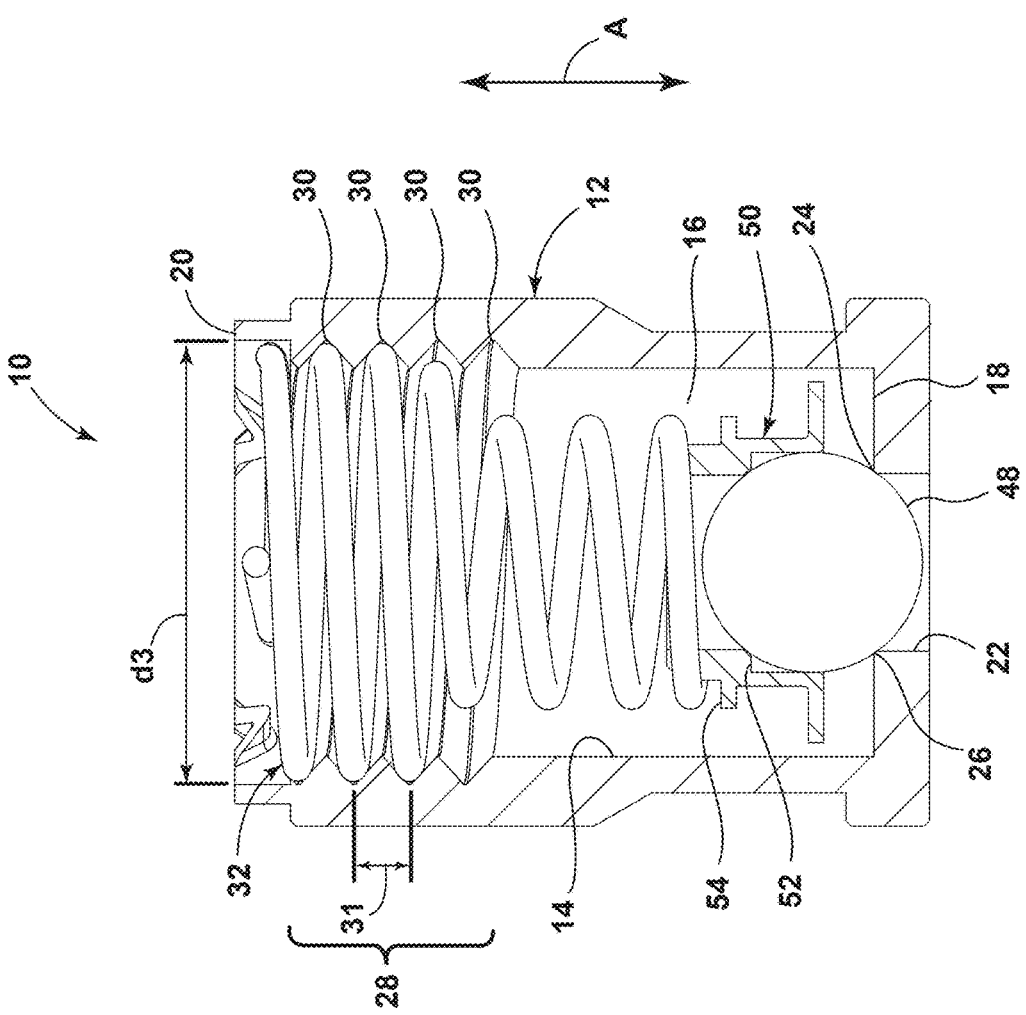
FIG. 2 is a side, partial sectional view of the pressure relief valve of FIG. 1.
Figure 3:
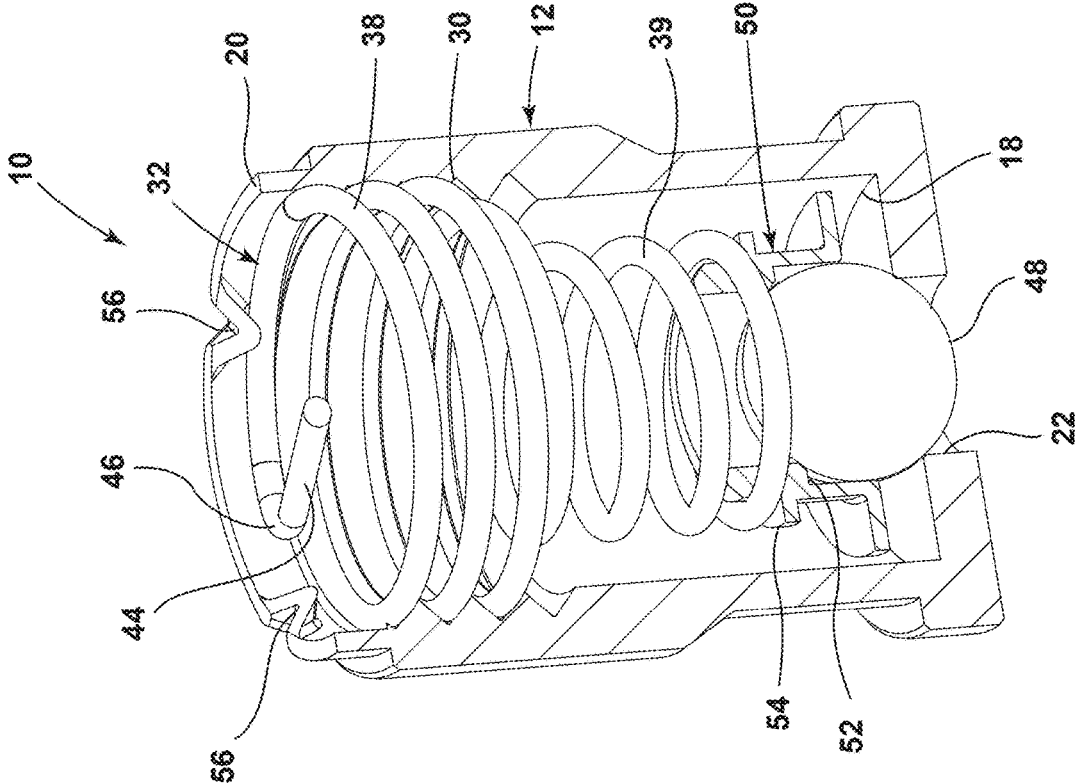
FIG. 3 is a perspective, partial sectional view of the pressure relief valve of FIG. 1.
Figure 4:
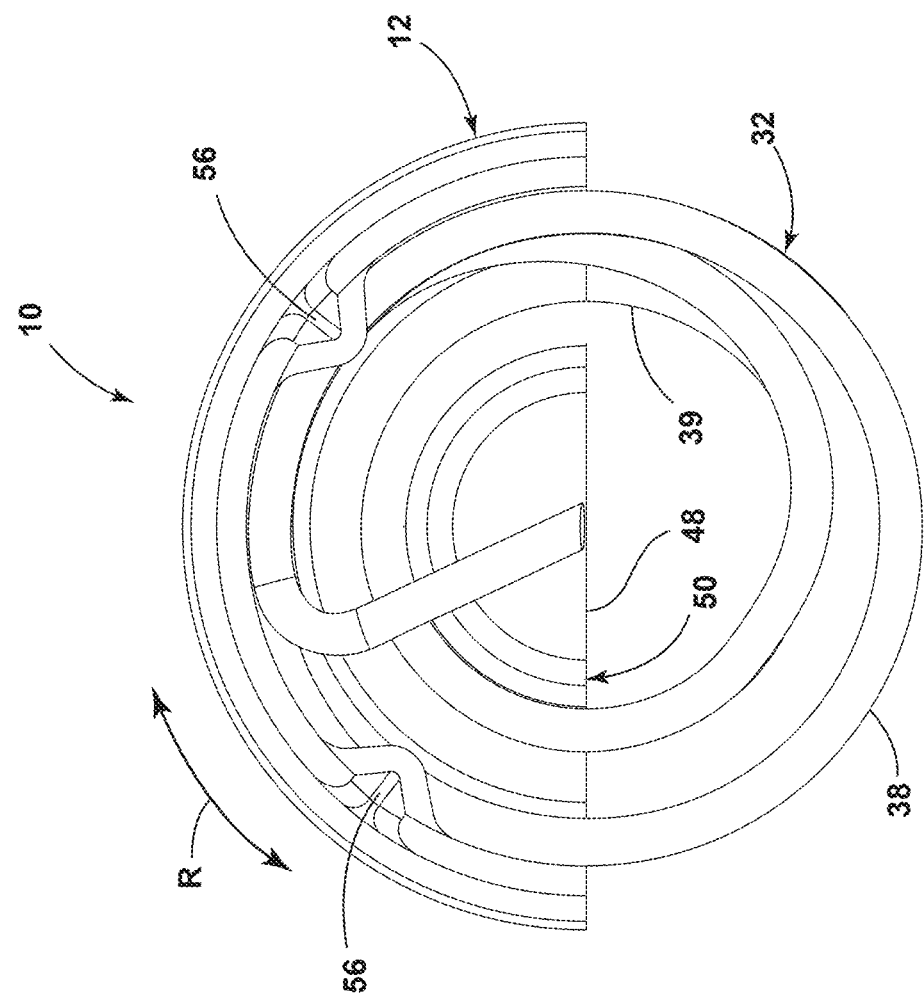
FIG. 4 is a plan view of the pressure relief valve of FIG. 1.
Figures 5, 6:
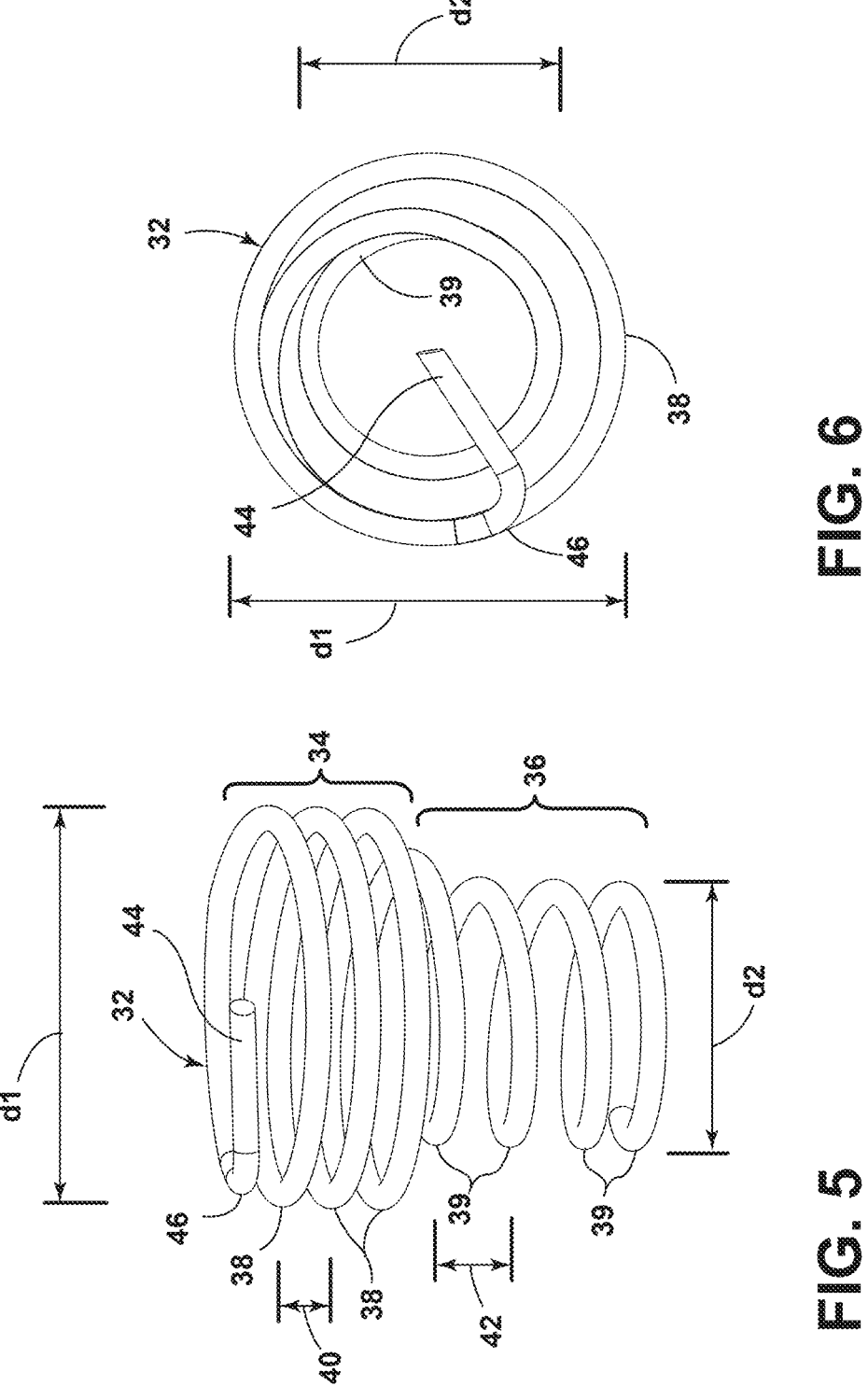
FIG. 5 is a side view of a dual-pitch, dual function pressure control calibration spring of the pressure relief valve of FIG. 1.
FIG. 6 is a plan view of the dual-pitch, dual function pressure control calibration spring.

The force application portion 36 urges a valve member 48 of the valve 10 in the axial direction A towards the valve seat 26. The valve member 48 is receivable on the valve seat 26, and in a closed disposition of the valve 10 the valve member 48 is urged into engagement with the valve seat 26 by the force application portion 36 of the spring 32. The valve member 48 may be a spherical or generally spherical ball, and the valve seat 26 may be circular or generally circular in shape. The end of the force application portion 36 may directly contact the valve member 48. In this case, the diameter of the coil turns 38 the force application portion 36 should be less than the diameter of the valve member 48. Alternatively, as shown in FIGS. 2-4, the valve 10 may further include an annular ring 50 disposed between the spring 32 and the valve member 48. The annular ring 50 includes an inner annular shoulder 52 inside of the annular ring. The inner shoulder 52 has an inside diameter that is less than the diameter of the valve member 48 and the inner shoulder 52 engages the valve member 48. The annular ring 50 also includes an outer annular plate 54 that contacts and is engaged by the force application portion 36 of the spring 32. The spring force of the spring 32 is transmitted via the annular plate 54 and inner shoulder 52 of the annular ring 50 to the valve member 48.

In the closed disposition, the valve member 48 is urged into engagement with the valve seat 26 by the force application portion 36 of the spring 32. A spring force of the force application portion 36 holds the valve member 48 against the valve seat 26. In use, when a liquid pressure external to the valve 10 and on the portion of the valve member 48 facing the aperture 22 becomes greater than the spring force of the force application portion 36 of the spring 32, the liquid pressure overcomes the spring force causing the force application portion 36 to at least partially compress in turn causing the valve member 48 to unseat from the valve seat 26. In this open disposition in which the valve member 48 is unseated, liquid may flow through the valve body 12 thereby relieving the liquid pressure. Advantageously, the calibration portion 34 of the spring 32 allows for the adjustment and setting of the spring force applied to the valve member 48 by the force application portion 36 and thereby allows for the adjustment of the opening pressure necessary to move the valve 10 into the open disposition. Rotation of the calibration portion 34 in the threads 30 of the threaded region 28 in one direction (e.g., a clockwise direction) moves the spring 32 (particularly the calibration portion 34) closer to the valve member 48 in the axial direction A, and thus compresses (increases the compression of) the coil turns 39 of the force application portion 36 to increase the spring force of the force application portion 36. Increasing the spring force increases the actuation pressure necessary to open the valve 10. Similarly, rotation of the calibration portion 34 in the threads 30 of the threaded region 28 in the opposite direction (e.g., a counterclockwise direction) moves the spring 32 (particularly the calibration portion 34) away from the valve member 48 in the axial direction A, and thus decompresses (reduces the compression of) the coil turns 39 of the force application portion 36 to decrease the spring force of the force application portion 36. Decreasing the spring force decreases the actuation pressure necessary to open the valve 10.

As shown in FIGS. 1-4, in various embodiments the valve 10 may include one or more stops 56 that limit the outward rotation of the calibration portion 34 of the spring 32. For example, the valve 10 may include four stops 56 that are evenly spaced approximately 90 degrees apart about the circumference of the cylindrical bore 16. The valve 10 may alternatively include fewer or more stops, and the stops need not be spaced evenly apart. Each stop 56 may be an inward projection along the inner wall 14 that projects inwardly into the cylindrical bore 16. The inward projection may be a bump in the inner wall 14 and/or may be formed by bending a portion of inner wall.

Figure 7:
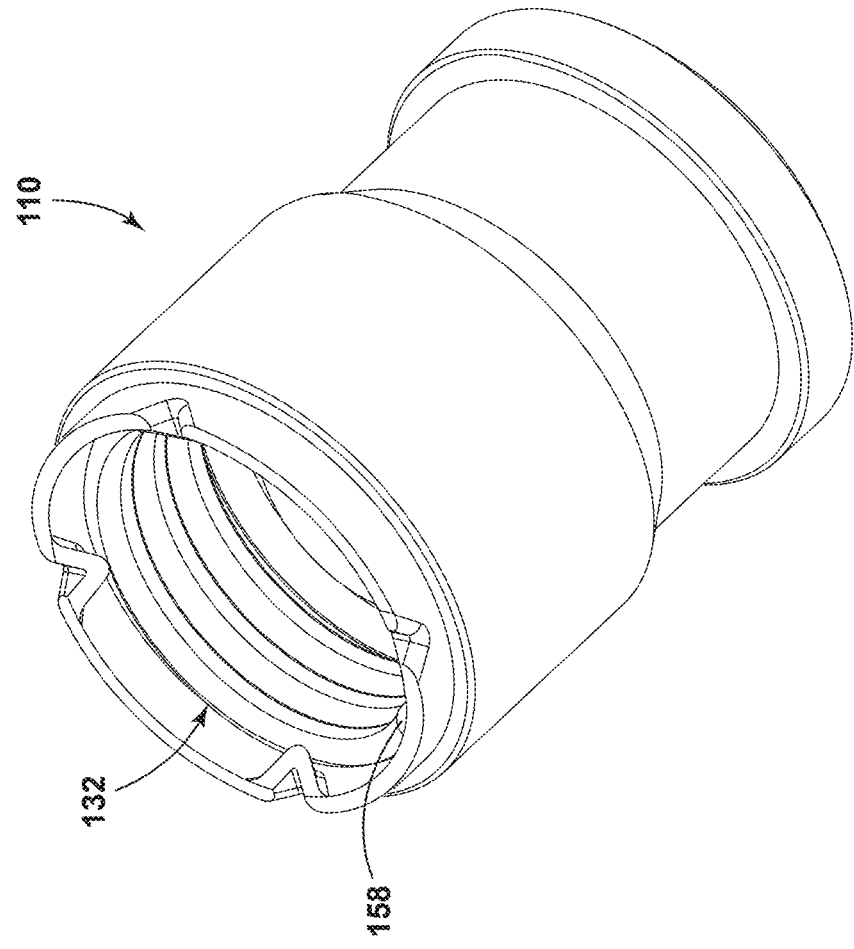
FIG. 7 is a perspective view of a pressure relief valve in accordance with other embodiments of the disclosure.
Figure 8:
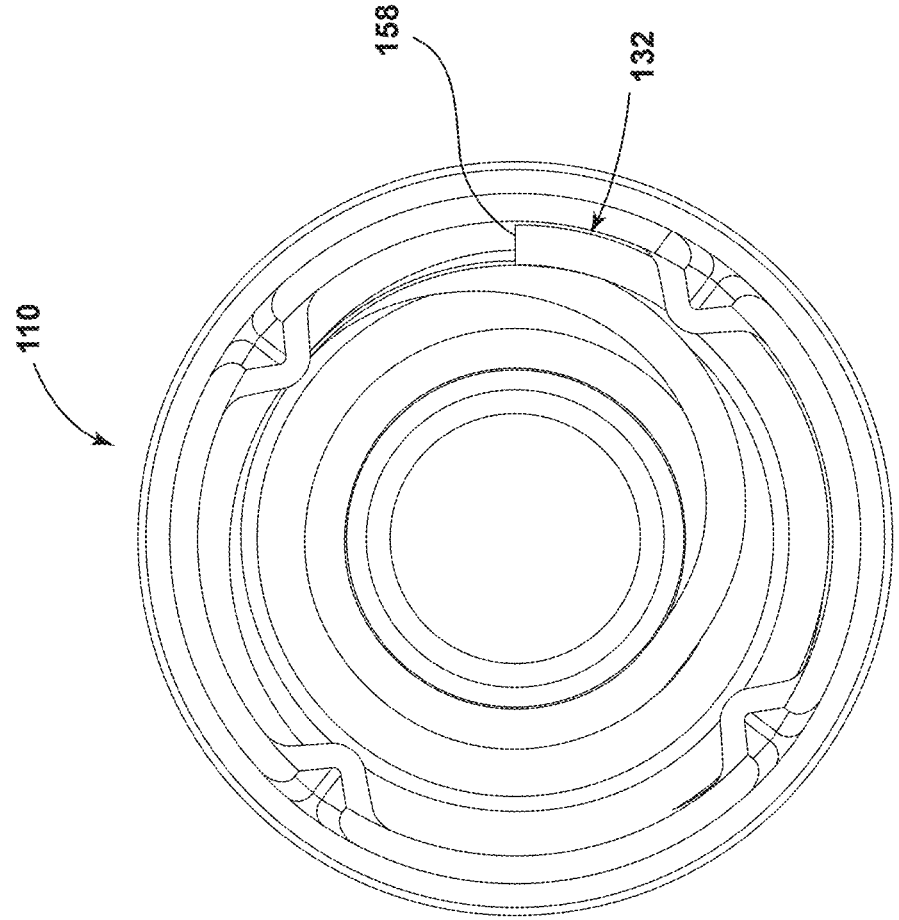
FIG. 8 is a plan view of the pressure relief valve of FIG. 7.

Turning now to FIGS. 7 and 8, in other embodiments the valve 110 includes a pressure control calibration spring 132 that does not include a handle one end. Instead, the pressure control calibration spring 132 terminates at an end 158 of one of the coil turns 138 adjacent the stops 156. The pressure control calibration spring 132 does not include any inward projection at the terminal end 158.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

What is claimed is:

1. A pressure relief valve comprising:
a valve body having a plurality of inner threads; and
a valve spring that is a coil spring including a first portion and a second portion, the first portion have a first pitch and the second portion having a second pitch, wherein the second pitch is greater than the first pitch;
the first portion of the valve spring being threaded into the inner threads of the valve body;
the first pitch of the first portion of the valve spring being equal to a pitch of the inner threads of the valve body;

wherein rotation of the first portion of the valve spring in the inner threads of the valve body adjusts an axial position of the valve spring within the valve body, thereby adjusting an actuation pressure of the pressure relief valve.

2. The pressure relief valve of claim 1, wherein the valve spring has a plurality of coil turns, the first portion being defined by a portion of the plurality of coil turns and the second portion being defined by another portion of the plurality of coil turns.

3. The pressure relief valve of claim 2, wherein a diameter of the coil turns defining the first portion is larger than a diameter of the coil turns defining the second portion.

4. The pressure relief valve of claim 1, wherein the valve body includes at least one stop that limits outward rotation of the first portion of the valve spring.

5. The pressure relief valve of claim 1, wherein the valve spring includes an arm extending from a terminal end of the first portion, the arm defining a handle for rotating the valve spring.

6. The pressure relief valve of claim 1, further comprising a valve member, wherein the valve member is urged in an axial direction by the second portion of the valve spring, and rotation of the first portion of the valve spring adjusts an amount of force applied to the valve member by the second portion of the valve spring.

7. A pressure relief valve comprising:
a valve body having an inner wall defining a cylindrical bore;
the inner wall including a threaded region having a plurality of threads;
a pressure control calibration spring including a calibration portion and a force application portion;
the calibration portion being threaded into the threads of the threaded region of the inner wall;
the valve body including an aperture in fluid communication with the cylindrical bore, an inner perimeter of the aperture defining a valve seat; and
a valve member receivable on the valve seat;
wherein the force application portion urges the valve member into engagement with the valve seat;
wherein the force application portion has a pitch that is greater than a pitch of the calibration portion;
wherein rotation of the calibration portion in the threads of the threaded region of the valve body adjusts the spring force applied to the valve member by the force application portion of the pressure control calibration spring.

8. The pressure relief valve of claim 7, wherein the pressure control calibration spring is a coil spring having a plurality of coil turns, the calibration portion being defined by part of the plurality of coil turns and the force application portion being defined by another part of the plurality of coil turns.

9. The pressure relief valve of claim 8, wherein the coil turns of the calibration portion are in series with the coil turns of the force application portion.

10. The pressure relief valve of claim 7, wherein a diameter of the coil turns defining the calibration portion is larger than a diameter of the coil turns defining the force application portion.

11. The pressure relief valve of claim 7, wherein the pressure control calibration spring includes an arm extending from a terminal end of the calibration portion.

12. The pressure relief valve of claim 11, wherein the arm is generally straight and extends inwards towards a center of the pressure control calibration spring.

13. The pressure relief valve of claim 7, wherein the valve member is a ball.

14. The pressure relief valve of claim 7, further comprising an annular ring including an inner shoulder that engages the valve member, the annular ring further including an outer plate engaged by the force application portion of the pressure control calibration spring.

15. The pressure relief valve of claim 7, further comprising at least one stop that limits outward rotation of the calibration portion of the pressure control calibration spring.

16. The pressure relief valve of claim 15, wherein each stop is an inward projection along the inner wall of the valve body.

17. A method of adjusting a pressure relief valve, the method comprising:

providing the pressure relief valve of claim 7;

applying a turning force to the pressure control calibration spring to rotate the calibration portion in the threads of the threaded region of the valve body;

whereby the rotation of the calibration portion adjusts the spring force applied to the valve member by the force application portion of the pressure control calibration spring.

18. The method of claim 17, wherein the rotation of the calibration portion moves the pressure control calibration spring closer to the valve member in an axial direction of the valve body to increase the spring force applied to the valve member, whereby an actuation pressure of the pressure relief valve is increased.

19. A method of making the pressure relief valve of claim 7, the method comprising:

providing the valve body having the inner wall defining the cylindrical bore;

disposing the valve member on the valve seat in the valve body;

forming threads in the inner wall to form the threaded region having the plurality of threads;

forming the pressure control calibration spring including the calibration portion and the force application portion, wherein the force application portion has a pitch that is greater than a pitch of the calibration portion;

threading the calibration portion into the threads of the threaded region of the valve body;

wherein the force application portion urges the valve member towards the valve seat, and rotation of the calibration portion in the threads of the threaded region of the valve body adjusts the spring force applied to the valve member by the force application portion.

20. The method of claim 19, wherein the pressure control calibration spring is a coil spring having a plurality of coil turns, the calibration portion being defined by part of the plurality of coil turns and the force application portion being defined by another part of the plurality of coil turns.

* * * * *